Aug. 24, 1954    R. E. DIETERICH    2,687,328
AUTOMOBILE VISOR AND ROOF MOUNT BRACKET THEREFOR
Filed Feb. 21, 1951    2 Sheets-Sheet 1
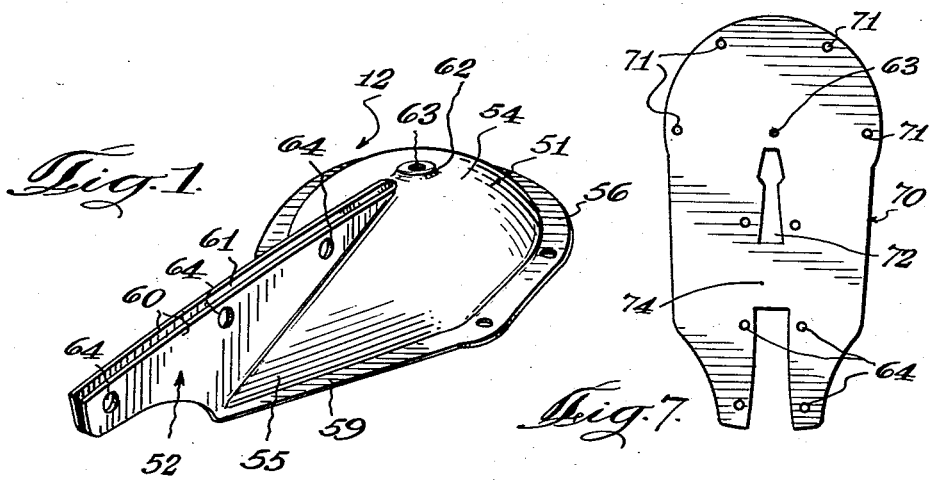
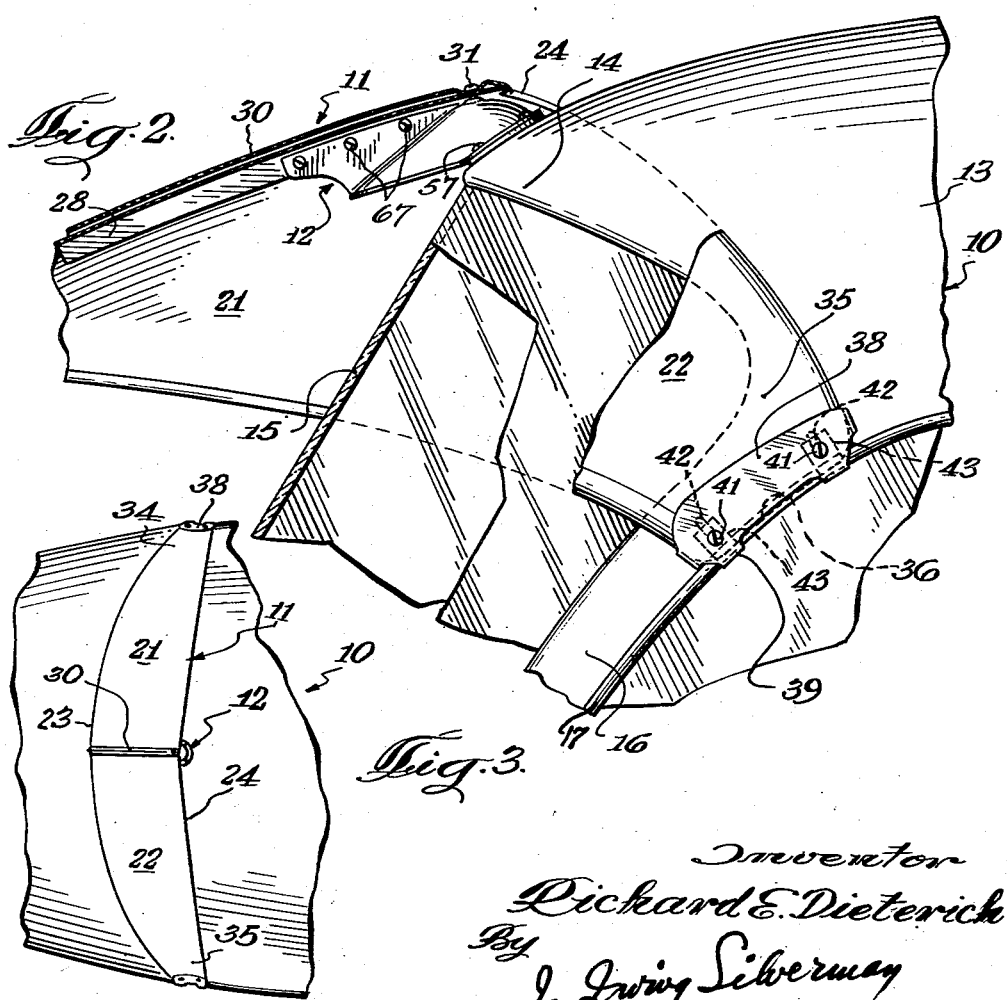

Aug. 24, 1954  R. E. DIETERICH  2,687,328
AUTOMOBILE VISOR AND ROOF MOUNT BRACKET THEREFOR
Filed Feb. 21, 1951  2 Sheets-Sheet 2
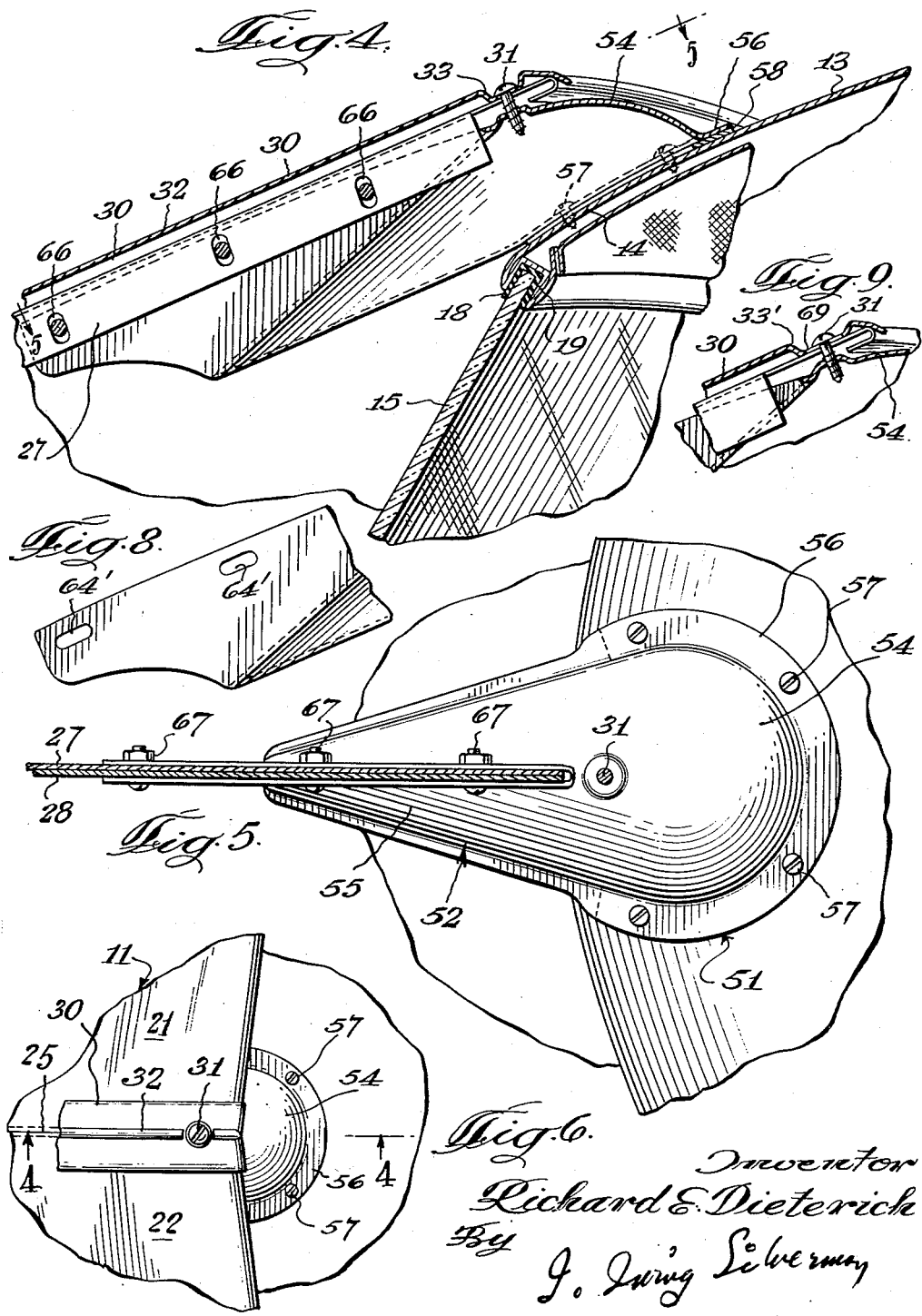

Patented Aug. 24, 1954

2,687,328

UNITED STATES PATENT OFFICE 2,687,328

AUTOMOBILE VISOR AND ROOF MOUNT BRACKET THEREFOR

Richard E. Dieterich, Long Beach, Ind.

Application February 21, 1951, Serial No. 212,162

3 Claims. (Cl. 296—95)

This invention relates to exterior automobile visors or windshield shades and more particularly is directed to the construction of a visor which is intended to be supported in shading relationship to the so-called one-piece windshield. As such, the construction is such that the central portion of the visor is supported from the roof of the automobile to which same is secured, and the ends of the visor are secured to the automobile alongside the windshield in any suitable manner. The invention also relates to a novel bracket for attaching the center of the visor to the rigid roof portion bordering the top of the windshield.

While the visor and bracket are intended for securement principally to one-piece windshields, the invention is not limited to such application. The visor and bracket are well suited for use on all types of windshields, having the advantage that there are no obstructions to the driver's view as occasioned by the existence of bracing members engaging the cowl of the automobile or the windshield divider strip on other visors. It is one of the objects of the invention to provide for a construction giving rise to this advantage.

The construction herein is an improvement over the visor and bracket construction shown in U. S. Letters Patent No. 2,527,247, dated October 24, 1950, entitled "Visor, Principally for One-Piece Windshield."

One of the important objects of the invention is the provision of a visor and bracket for supporting the visor from the central portion of the roof of an automobile, which will be sturdy and durable, and well able to withstand great wind pressures, without danger of becoming unfastened, without the likelihood of bending or buckling either the bracket or visor, and without unduly flexing the visor of causing vibration thereof.

Another important object of the invention is the provision of a novel bracket which will be suported over a relatively wide area of the automobile roof and thereby place no undue strain upon the skin of the roof while providing excellent stability thereon.

Still another object of the invention is the provision of a novel bracket which is formed with a dome-like support whereby to provide a minimum of resistance to passage of wind and to provide a strong support for the trailing edge of the visor while retaining the same space above the roof of the automobile.

Another object of the invention is to provide a construction whereby the bracket supporting the visor provides support by means of shear members as well as a tension member.

Other important objects of the invention lie in the constructional details of the bracket whereby same is made of a simple, easily fabricated member of great economy, which is easy to mount and attach; the fabrication of the roof mount bracket as a unitary member formed by a minimum of operations from a single blank of material so that very little scrap results.

Many additional objects and advantages will become apparent as a description of the visor and roof mount bracket proceeds, in connection with which I have described a preferred embodiment and illustrated the same in the accompanying drawings, showing the manner in which my invention is practised, and the visor associated with an automobile in windshield shading relationship. The details of size, proportion, and the exact arrangement of the elements of the invention are capable of considerable variation without departing from the spirit or sacrificing any of the advantages of the invention.

Referring to the drawings in which the same characters of reference are employed to indicate corresponding or similar parts throughout the several figures of the drawings:

Fig. 1 is a perspective view of an unmounted roof mounting bracket constructed in accordance with my invention.

Fig. 2 is a fragmentary side elevational view of the windshield portion of an automobile showing my improved visor and bracket attached thereto, portions of the visor and the windshield being shown in section for purposes of clarity.

Fig. 3 is a top plan view of the front of the automobile roof showing the visor and bracket of my invention mounted thereon.

Fig. 4 is a median sectional view through the visor and bracket taken generally along the center line of the automobile along the line 4—4 of Fig. 6 and in the indicated direction.

Fig. 5 is a top view of the bracket, being a sectional view through the visor along the line 5—5 of Fig. 4 and in the indicated direction.

Fig. 6 is a detailed plan view of a portion of Fig. 3 but taken on an enlarged scale to show the top rear appearance of the visor when secured to the automobile in windshield shading relationship.

Fig. 7 is a top plan view of the single blank of metal from which the entire roof mount bracket is formed.

Fig. 8 is a fragmentary side elevational view of the forward end of the bracket of my invention but showing a slight modification thereof.

Fig. 9 is a fragmentary detailed view identical to the upper portion of the view of Fig. 4, but showing a slightly modified form of the invention suitable for use with the bracket of Fig. 8.

Generally the invention consists of a visor of metal which is in the form of a curved member which extends in an arc from one windshield pillar to the other across the front of the automobile directly above the windshield, in combination with the novel bracket for securing the center of the visor to the roof of the automobile. The visor itself may be formed of a single panel suitably curved and shaped to harmonize with the lines of the automobile or it may consist of more than one panel suitably joined either at the center or at other places. The most preferable form of the visor is one which consists of two mating mirror parts each having a depending flange at the contiguous ends together forming the center of the visor so that when abutted, there is formed a depending flange at the center to cooperate with a suitable element of the bracket as will be explained.

The juncture of the forwardly extending portion of the bracket with the center of the visor is provided by an engagement of a depending flange or fin of the visor within a pair of spaced apart fins formed on the bracket, the depending flange being thus inserted in sandwiching relationship within the slot of the spaced apart fins of the bracket. The juncture is rendered firm by suitable fastening means.

Obviously, the depending flange or fin of the visor may be formed of the visor material itself, may be in the form of a punched out flange, may be welded or otherwise secured at the center of the visor on its under side, all within the scope of the invention. Said depending flange need not necessarily engage within the said slot of the bracket, but could obviously straddle a fin or fins formed on the bracket and sandwich said bracket fins in a reversal of parts. It is preferred, however, to have the arrangement referred to and hereinafter described because of the simple and sturdy attachment making for foolproof assembly of the visor and bracket.

The visor ends are not of importance so far as this invention is concerned, except of course, insofar as they provide securement of the visor to the automobile. I have shown the visor ends attached to the automobile gutters by clamping means familiar in the art, but it should be understood that the ends of the visors could be screwed or welded to the gutters, could readily be attached by screw means to the windshield pillars, or could be fastened by many other ways. The illustration of only one method of attachment should suffice.

The structure of my invention is most desirably used in connection with a visor "tailor-made" for a certain kind of vehicle. By this it is meant that the greatest benefits for sturdy securement and cheap manufacture as well as simplicity of attachment are achieved when the various parts of the device are made with relatively few allowances for adjustment. The visor and bracket under these conditions are intended to be attached only to a certain kind of vehicle having certain contours and certain dimensions. This preference is, however, not a limitation on the invention. Due to the flexibility of the metal from which the visor can be formed, certainly the secured ends can be provided with means for enabling slight adjustments in position upon the windshield pillars, and in pitch of the visor, notwithstanding the absence of provision for adjustments in the center of the visor. The pitch of the visor relative to the bracket can be slightly adjusted merely by providing slots in the depending fin of the visor which are substantially perpendicular to the plane of the visor panels. The invention contemplates that provision can be made for adjustments of visor position relative to the windshield, including height and pitch so that visors and brackets constructed in accordance with my invention can be made for substantially universal use on many different types of vehicles.

Referring now to the specific details of the preferred embodiment illustrated, the reference character 10 designates generally an automobile having my new visor designated generally 11, and bracket designated generally 12, installed thereon. The automobile or vehicle 10 is constructed in any suitable manner and forms no part of the invention, but is provided with a roof 13 having at least a rigid front portion 14 which curves downwardly to meet the glass windshield 15. It will be noted that the windshield 15 is shown as a single curved plate of glass without a central dividing strip. Such a construction has in recent years become increasingly used due to the obstruction to vision occasioned by the use of two planar halves joined at the center of the windshield by means of a divider or molding strip.

In accordance with the dictates of modern streamlined vehicles, the windshield 15 is cambered, i. e., curved about the automobile cab in a sort of forwardly pointing V, and is slanted backward to shed the onrushing air. Any suitable construction can be used, and I have shown the windshield supported on opposite sides by pillars 16 which in turn are bordered by rain gutters 17 of the usual U-shaped construction, following the contours of the automobile 10 and secured to the pillars 16. The windshield 15 is set in some sort of water-tight gripping means, such as for example rubber channels 18 which extend around the windshield, and are anchored in any suitable metal molding 19.

The visor 11 is formed of a pair of generally elongate panel members 21 and 22 which may be curved and formed in any graceful and pleasing manner to harmonize with the contours of the automobile 10. The visor is positioned above the windshield 15 in familiar shading relationship, and it will be obvious from Fig. 3 that in a plan view, the leading and trailing edges 23 and 24 respectively extend forward and rearward of the bottom and top edges of the windshield. Although this is highly desirable, it is not absolutely essential. From a practical standpoint, however, the trailing edge 24 best overlies the front rigid roof portion 14 to assure an exclusion of direct sunlight from the top of the windshield. In addition, certain features of the invention make this arrangement preferable as will be pointed out.

The center of the visor 11 is formed of a juncture 25 of the two panels 21 and 22 on a line which coincides with the front-to-rear axis of the automobile. The illustrated visor 11 has mating depending flanges 27 and 28 integrally bent from the ends of the respective panels 21 and 22 which together form a depending fin engaged in the bracket 12 as will be described. There is an ornamental cover plate or escutcheon 30 covering the juncture 25, fastened in place by a screw 31 which passes into the top of the bracket 12 as will also be described hereinafter. The ornamental ridge 32 which has a seating depression 33 for the screw 31 is of little structural significance, although it somewhat stiffens the escutcheon plate.

The visor panels 21 and 22 are identical and opposite and each has a narrowed end 34 and 35 respectively which is intended to be fastened to the pillars at the sides of the windshield 15. Only the left hand side of the fastening arrangement will be described since the opposite or right hand side is identical. The free end 35 of the visor panel 22 is shown (in broken lines in Fig. 2) engaged in the crook of the gutter 17 at 36. A fastening plate or bracket 38 engages over the outside of the free end 35, with a pair of fingers 39 hooking under the gutter 17, so that the free curl of the gutter is sandwiched between the end 35 and the plate 38. The plate 38 is held in tight engagement by screws 41 which pass through the plate 38, through slots 42 in the end 35 and are screw threaded into sheet metal nuts 43 on the rear of the visor end 35. By this method of securement the ends of the visor 12 are clamped to the gutters 17, the slots 42 enabling limited adjustment of visor pitch. The visor is made of relatively thin gauge metal and susceptible to some twisting and bending to permit this, and as well, other provisions for such adjustment easily can be made.

Although only one method of securement of the visor ends has been described, obviously there are many ways of attaching the visor to the sides of the windshield. The ends may be screwed to the gutters, secured into the inside of the door frame, mounted on the pillars 16, or the like. The invention is independent of any manner of attachment of the ends, it being necessary only that the visor be secured to the automobile alongside of the windshield, and in case the visor is to be capable of being adjusted, provision be made for enabling such adjustment.

The bracket 12 is the center support for the visor 11 and is mounted upon the center of the rigid roof portion 14. Although I have shown only one of such brackets, it is within the scope of the invention to use a pair in which case one will support each of the panels 21 and 22. I have found however that the construction is so strong and durable that only one of such brackets is needed in the center of the visor adequately and satisfactorily to support the same. The bracket consists of two parts, a base portion 51 which is adapted to be secured to the forward sloped rigid roof portion 14, and a rigidly connected forwardly extending arm portion 52 which extends a substantial distance forward of the base portion so that it is poised above the windshield 15 and is adapted to be secured to the underside of the center of the visor 11.

The bracket 12 is best illustrated in Figs. 1, 4 and 5. The base portion is formed as a pear-shaped hollow dome 54 having an elongate tapered portion 55 which is arranged to extend forwardly and downwardly relative to the roof 13. Note in Fig. 4 that when the bracket is secured to the forward sloped portion 14 of the automobile roof 13, that the tapered portion 55 is substantially below the level of the roof portion 14 to which the bracket is secured. The dome 54 has a flange 56 integrally formed therewith which encircles the circular portion of the dome 54, to the rear thereof, and this flange is pierced to enable sheet metal screws 57 to be driven into the roof 13 to fasten the bracket in place. There is a gasket 58 of live rubber or the like interposed between the flange 56 and the roof to provide a water-tight connection.

The tapered portion 55 has small flanges 59 along its opposite edges for strength. It has the arm portion 52 integrally formed therewith. The arm portion is formed of a pair of forwardly elongate vertically arranged plate members 60 which are arranged in spaced relationship thereby to form a slot 61 therebetween. These plate members 60 together extend a substantial distance forward and downward to reach under the visor 11 when the bracket is mounted to the roof. They serve as strong cantilever members, and may be considered a beam secured to the base 51 at one end and supporting the center of the visor 11 from their other end. Since the plate members 60 are integrally formed with the tapered portion 55 they intersect the same and divide the said tapered portion into two halves. This facilitates fabrication as will be seen.

The top of the dome is provided with a boss 62 having a screw threaded opening 63 therein. In mounting the visor upon the bracket the screw 31 is designed to be engaged in the opening 63 thereby to firmly and rigidly anchor the trailing edge 24 of the visor 11 to the automobile. Obviously the trailing edge 24 will be spaced above the roof 13 to permit air to pass under the visor 11 when the vehicle is moving.

In assembling the visor and fastening same to the vehicle, the fin of the visor 11, or in the case of the illustrated embodiment, the combined flanges 27 and 28 are together inserted into the slot 61 from the top thereof, and fastened in place. The plate members 60 are appropriately pierced as shown at 64 and the flanges 27 and 28 having aligned openings 66 so that the flanges and plates may be bolted into tight engagement by suitable bolts 67. Note that the openings 66 are actually slots permitting relative movement between the visor 11 and bracket 12. Slight adjustments in pitch and height of the visor relative to the windshield 15 can thus be made in conjunction with the movement of the screws 41 in slots 42. Since the bracket is secured only to the rear portion of the depending fin, said fin can be formed prior to assembly of the visor upon the bracket by securing together the front portions of the flanges 27 and 28, for example.

By slight modifications, it is possible to provide for adjustment of the visor forward and backward relative to the bracket 12. Thus if the openings 64 are slotted as shown at 64' in Fig. 8 and the seating depression 33 elongated as shown at 33' in Fig. 9, and instead of being pierced the escutcheon plate 30 is provided with an elongate slot 69, such adjustment can be made if desired. Notwithstanding, the tightening of all fastening means will render the entire assembly rigid.

It is desired to point out that the use of a dome member as the base provides great strength to the bracket 12 without increased weight or the use of complex structural members. The gauge of metal used can be very thin and still provide great rigidity and sturdiness. For example, the bracket for certain purposes has been made from 16 gauge cold rolled steel and successfully used on vehicles travelling at great speeds. The dome member serves to distribute the stress from the visor over a relatively larger surface of the sloped portion 14 of the roof 13 so as not to buckle or strain any part of the roof.

Considering the visor and bracket from a kinematic standpoint, the visor's arrangement relative to the windshield provides a funnel into which the onrushing air enters so that the pressure from beneath tends to lift the visor from the automobile in an upward direction. If the bracket 12 is presumed rigidly secured to the automobile body, the visor is held thereto by the bolts 67 which are stressed in shear, and by the screw 31 which is stressed in tension. The attachment is therefore extremely strong and well able to withstand any of the forces to which same might be subject under any normal conditions.

The construction of the bracket 12 in accordance with my invention makes it feasible and desirable to construct the same in a very economical and facile manner. The entire bracket is desirably formed of a single member of sheet metal stamped, for example, from a continuous strip. Such a flat sheet metal member is shown at 70 and it will be noted that same is somewhat oval in shape so that there is a minimum of scrap from a rectangle. During the stamping operation, the openings for the screws 57 are pierced at 71, the opening 63 is pierced, and the openings 64 are pierced. The slot 61 is formed from a keyhole shaped recess 72 and a second recess 73 which is separated by a web 74. The blank is progressively formed in forming dies to the configuration of Fig. 1, during which process the web 74 is removed. This eliminates any assembly operations and results in a unitary sturdy structure.

Obviously the invention is capable of many variations in minor details and insignificant points without departing in any way from the spirit or scope of the invention as defined in the appended claims. The bracket 12 while being constructed as a unitary member, and formed from the blank shown in Fig. 7 can be made of a number of members secured together, and need not necessarily be produced in the manner described. It is desired to emphasize that the preferred embodiment has been shown only for illustrative purposes and to assist in an understanding of the invention.

What is claimed and desired to be secured by Letters Patent of the United States is:

1. In combination with an elongate shading member adapted to be secured to a vehicle having a windshield, in shading relationship to the windshield, and having the ends of said member secured to the vehicle alongside the windshield, said vehicle having a rigid roof portion bordering the top of the windshield, a bracket adapted to be secured to the roof portion and having a forwardly directed extension engaged with the bottom of the shading member and supporting the same, said bracket including a base with an upstanding portion and having the trailing edge of the visor secured to the top of the upstanding portion in addition to its securement to the forwardly directed extension, whereby to space same above the roof portion when installed thereon.

2. In combination with an elongate shading member adapted to be secured to a vehicle having a windshield, in shading relationship to the windshield, and having the ends of said member secured to the vehicle alongside the windshield, said vehicle having a rigid roof portion bordering the top of the windshield, a bracket comprising a base portion and a forwardly extending rigid cantilever beam member rigidly secured to said base portion, the cantilever beam portion being attached to the underside of the visor to support the same thereat, and the base portion being of a dome-like formation having its circumferential edge adapted for securement to said roof portion, and having the rear edge of the visor secured to the top of the dome-like formation.

3. A bracket of the character described for supporting the center of a windshield shading member in proper spaced relationship to a vehicle windshield having a rigid roof portion adjacent the top thereof, said bracket comprising an integrally formed member having a base portion adapted to be secured to the center of said roof portion, said base having an elongate, tapered dome-like formation extending forwardly and downwardly relative to said roof portion with the tapered portion disposed substantially below the roof portion, said dome having a flange encircling the same and an opening in the top thereof for securing thereat the rear edge of said shading member, a pair of spaced downwardly extending, rigid cantilever beams extending from said tapered portion and adapted to have the central portion of said shading member secured therebetween.

References Cited in the file of this patent

UNITED STATES PATENTS

| Number | Name | Date |
|---|---|---|
| 1,189,562 | Groehn et al. | July 4, 1916 |
| 1,334,048 | Powers | Mar. 16, 1920 |
| 2,334,856 | Atkinson | Nov. 23, 1943 |
| 2,500,406 | Greenfield | Mar. 14, 1950 |
| 2,527,247 | Dieterich | Oct. 24, 1950 |
| 2,573,039 | Maher | Oct. 30, 1951 |